United States Patent [19]
Rinner

[11] Patent Number: 6,058,820
[45] Date of Patent: *May 9, 2000

[54] ROD CUTTER

[75] Inventor: James A. Rinner, Racine, Wis.

[73] Assignee: Beere Precision Medical Instruments, Inc., Racine, Wis.

[*] Notice: This patent issued on a continued prosecution application filed under 37 CFR 1.53(d), and is subject to the twenty year patent term provisions of 35 U.S.C. 154(a)(2).

[21] Appl. No.: 09/069,697

[22] Filed: Apr. 29, 1998

[51] Int. Cl.[7] .................................................. B26D 3/16
[52] U.S. Cl. .................................. 83/200; 83/633; 30/93; 30/253
[58] Field of Search ............................... 30/253, 191, 193, 30/175, 176, 186, 93, 94, 95; 83/633, 634, 199, 200

[56] References Cited

U.S. PATENT DOCUMENTS

| | | | |
|---|---|---|---|
| 690,083 | 12/1901 | Stolpe | 83/199 |
| 812,452 | 2/1906 | Richards | 83/200 |
| 1,265,345 | 5/1918 | Rock | 83/200 X |
| 1,874,616 | 8/1932 | Porter | 30/193 X |
| 2,527,735 | 10/1950 | Johnson | 30/93 X |
| 2,649,913 | 8/1953 | Linder | 83/200 |
| 2,910,900 | 11/1959 | Klein | 30/193 X |
| 5,261,303 | 11/1993 | Strippgen | 83/199 |

FOREIGN PATENT DOCUMENTS

| | | | |
|---|---|---|---|
| 372 | 2/1869 | United Kingdom | 83/199 |
| 4029 | 2/1907 | United Kingdom | 83/199 |

*Primary Examiner*—Rinaldi I. Rada
*Assistant Examiner*—Charles Goodman
*Attorney, Agent, or Firm*—Arthur J. Hansmann

[57] ABSTRACT

A rod cutter having two force-applying members pivotally attached together. A cutter is pivotally mounted on each of the members in a mechanical advantage arrangement. The cutters both have extending ends which are pivotally connected together and have rod cutting edges thereon, all for force-advantage cutting.

21 Claims, 3 Drawing Sheets

ROD CUTTER

This invention relates to rod cutter, and, more particularly, it relates to a rod cutter of a type which is useful in cutting rods for use in the medical art of implanting rods for spinal fixation in a person's body.

BACKGROUND OF THE INVENTION

Rod cutters, for use in spinal implant, are already commonly known. These cutters can be arranged to have a supporting base which rests upon a table top or the like, and a relatively long handle is pivoted to the base for actuating cutters which sever a rod to be used in the spinal implant. In that endeavor, the goal is to provide a rod cutter with sufficient mechanical advantage or cutting leverage so that the user can sufficiently manipulate the pivotal handle for severing the rod with a minimum of effort, and also for cutting rods of varying cross-sectional sizes.

The present invention accomplishes the aforementioned, and it does so by means of a table-mounted rod cutter which presents a mechanical force-advantage arrangement so that reliable but only minimal hand force is required by the user in accomplishing the cutting of the rod.

Still further, the rod cutter of this invention is arranged so that a single cutter can be utilized for receiving and cutting rods of several different cross-sectional sizes. That is, noseparate and special rod cutter is required for each size of rod to be cut.

Another object and advantage of this rod cutter is to have the arrangement of two cutters which present the cutting edges, and with the cutters being identical to each other and thus interchangeable in their positions in the cutter itself. The cutters of this invention can be readily removed from their original installed position and can be interchanged and/or inverted so that they present different cutting edges, and thus the original cutter with its different cutting edges can be repositioned to fully utilize all of its cutting capacity, that is, in various cutting edges.

Again, the cutter of this invention is arranged to be sturdy in its construction and reliable in operation to assure that the rod is cut, as intended and as desired, and the mechanical advantage provided by this cutter is such that the actual length of the manually-operated handle can be of a shorter length than otherwise required in a cutter where the mechanical advantage is less than that of the cutter of this invention. In actuality, the mechanical advantage of this cutter is compounded in that it exists in two steps in a series where the handle exerts a first mechanical advantage and then the cutter itself exerts another mechanical advantage.

While the drawings show the cutter with table-mounting means, it will be readily seen and understood that the cutter could also be one with two handles pivoted together, off table.

BRIEF DESCRIPTION OF THE DRAWINGS

FIG. 4 is a sectional view taken on the line 4—4 of FIG. 1.

FIG. 5 is a diagrammatic view showing the movement of the parts of the rod cutter.

DETAILED DESCRIPTION OF THE PREFERRED EMBODIMENT

Figure 1:
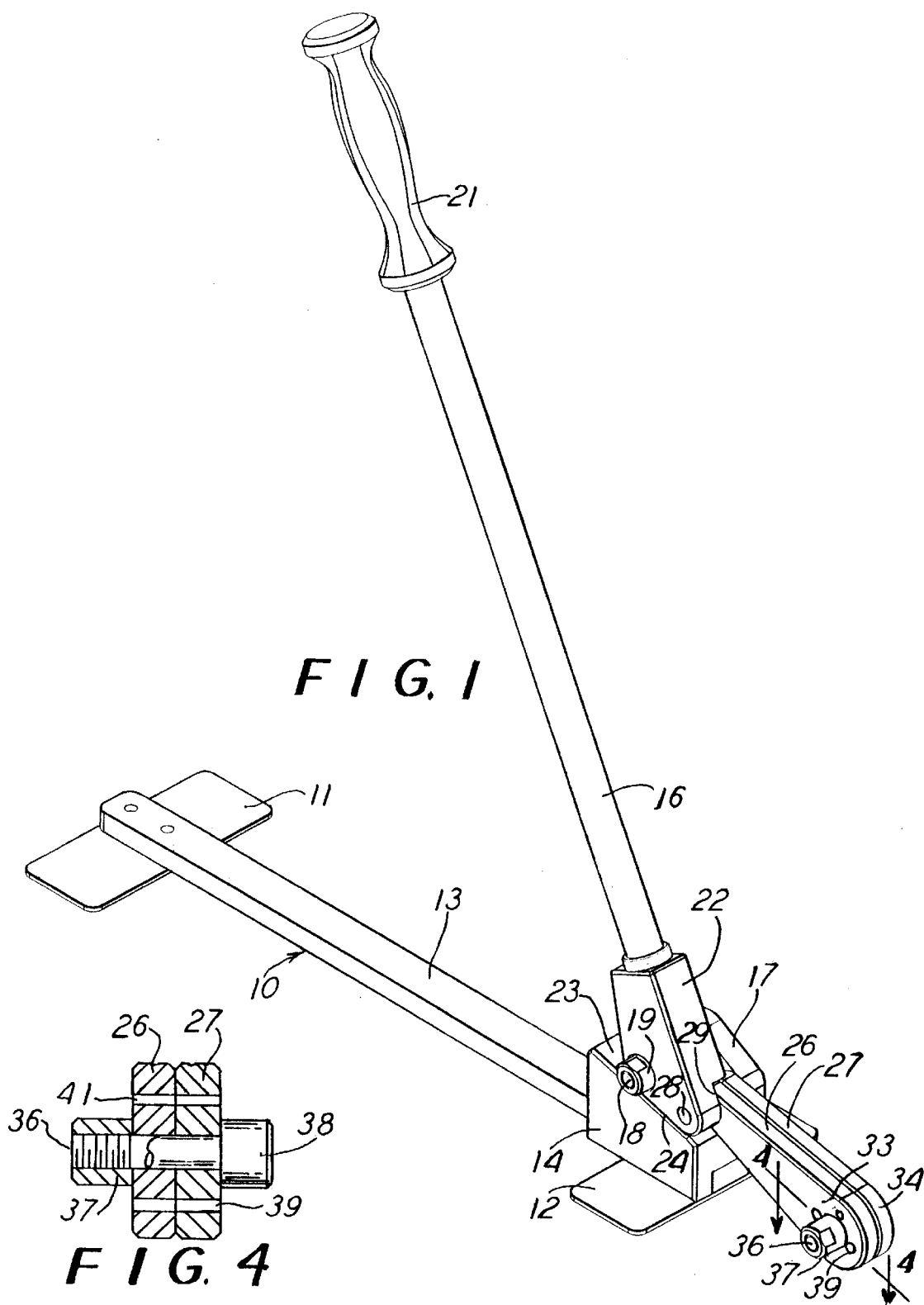
FIG. 1 is a perspective view of a rod cutter of this invention shown in its initial position.

There is a base 10 which is arranged for being supported on a table top or the like, and it has mounting pads 11 and 12 and an inter-connected beam 13. Also, the base presents a block 14 which is fixed with the pad 12 and beam 13.

In the FIG. 1 position, there is an upstanding handle 16 which is pivotally mounted on the base 10 at the block 14. Thus, it will be seen that the block 14 has an upstanding side wall 17 which receives a pivot pin 18, such as in the form of a bolt having a releasable lug 19 on the end shown in FIG. 1. With that arrangement, the handle 16 pivots about the axis of the bolt 18 and relative to the base 10. Thus, the handle 16 can be pressed downwardly by the operator gripping the hand grip 21 and pivoting the handle downwardly to the position shown in FIGS. 2 and 3.

The lower end of the handle 16, as viewed in FIG. 1, has a block 22 which is connected to the upper portion of the handle 16, and the block 22 receives the pivot bolt 18 which extends therethrough as well as through the base wall 17. Also, as shown, the block 14 has an angulated upper surface 23, and the handle block 22 has an angulated surface 24, and the surfaces 23 and 24 can be disposed parallel to each other in the initial or starting position which is the upright position for the handle 16. Thus, the base block 14 accommodates the mounting and the pivoting of the handle 16 relative to the block 14, as shown between the FIGS. 1 and 2. Of course the nut 19 provides for ready release of the pivot bolt 18, for repair or interchange of parts, as mentioned hereinafter, and the bolt 18 provides the pivot mounting for the handle 16.

Two cutters 26 and 27 are also assembled in the rod cutter shown herein, and the cutters can be of identical configuration, size, and overall dimensions. They are shown to be elongated in that they extend away from the base block 14 and the handle block 22, and, in the initial or FIG. 1 position, they are in side-by-side position aligned with each other to be of only one profiles, when surfaces 23 and 24 are together.

The cutter 26 is pivotally mounted relative to the handle block 22 by means of a pivot pin 28 extending through the cutter 26 and the block 22. Further, the block 22 has a cut-out at 29 to accommodate receiving the one end of the cutter 26, that is, the end which is behind the block 22 and which is shown as the end 31 in FIG. 3.

Figure 2:
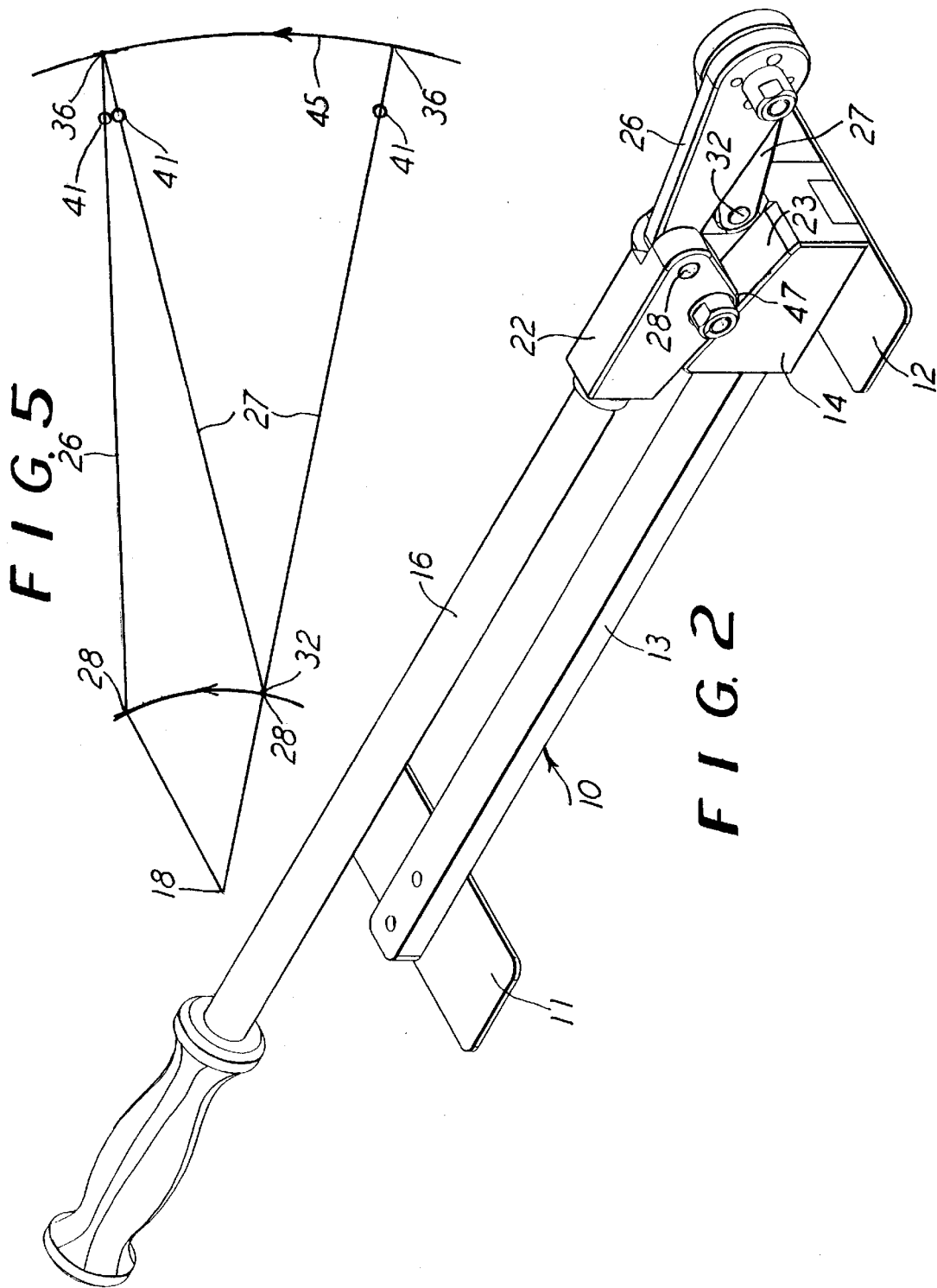
FIG. 2 is a perspective view of the rod cutter of FIG. 1, shown in its final position.
Figure 3:
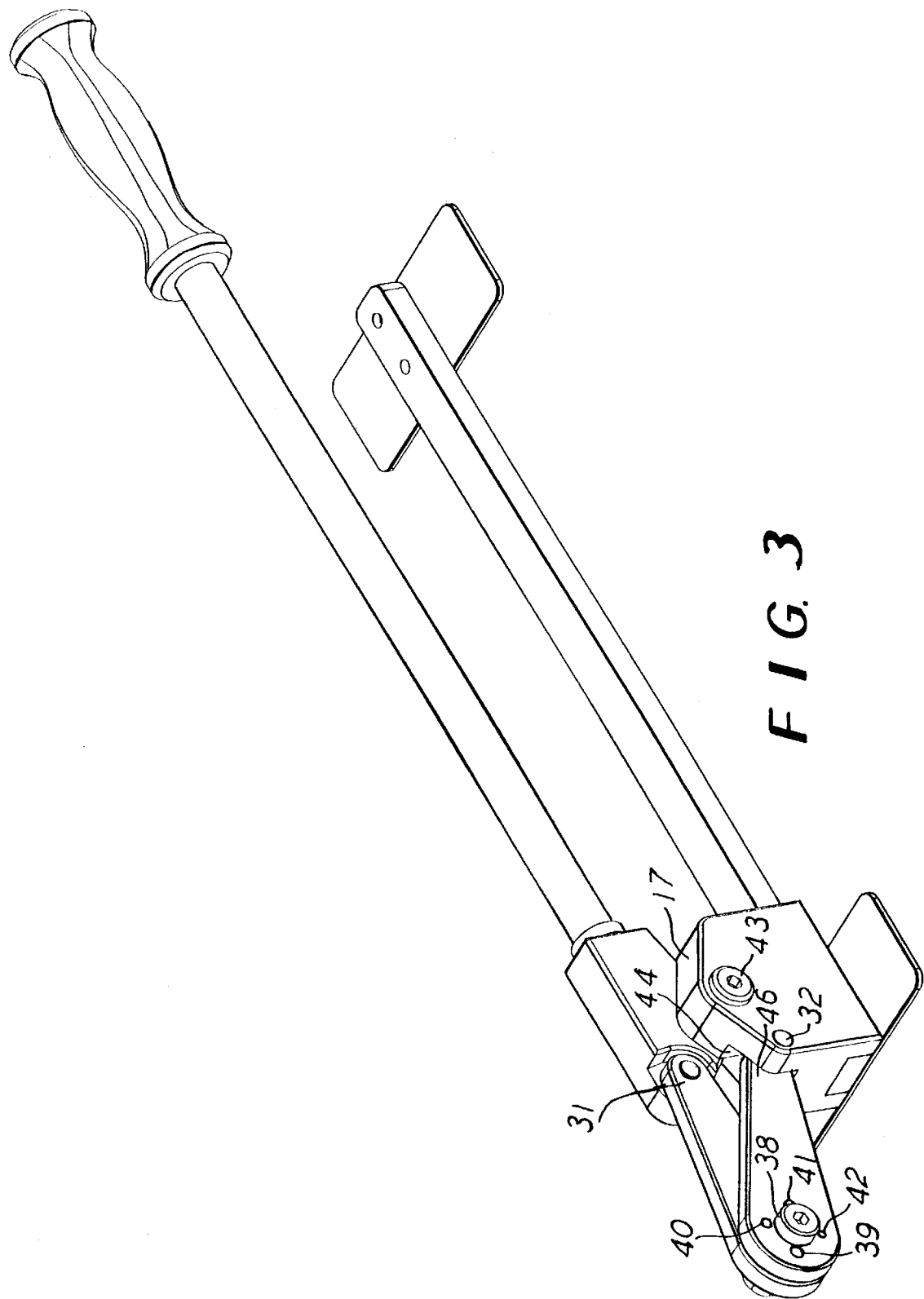
FIG. 3 is a perspective view of the rod cutter but showing the side opposite from FIG. 2.

The cutter 27 is pivotally mounted directly to the base block 17 by means of a pivot pin 32, as seen in FIGS. 2 and 3. Thus, the pins 28 and 32 provide for pivot mounting of the respective cutters 26 and 27.

The cutter extending ends 33 and 34 are pivotally connected by means of a pivot bolt 36 extending therethrough, and a nut 37 secures the bolt 36 relative to the bolt head 38 as seen in FIG. 3.

With the arrangement described, pivotal movement of the handle 16 from the FIG. 1 position to the position shown in FIGS. 2 and 3 will cause the cutters 26 and 27 to pivot relative to each other and to assume the positions shown in FIGS. 2 and 3 when the handle 16 is moved all the way down as seen.

FIG. 5 diagrammatically shows the initial position, lower designated 27, for the cutter 27, and it also shows the pivot axis for the bolt 18 and the pivot axis for the pin 28, and it further shows the pivot connection for the bolt 36. In that showing, the distance between the now designated axes 18 and 28 is approximately one-third the distance between the now designated axes 28 and 36. Also, the pivot pin 32 for the cutter 27 has an axis designated 32 in FIG. 5, and that is co-axial with the axis 28. Likewise, the pivot bolt 36 provides a common pivotal connection at the outer ends of the cutters 26 and 27 so that is also co-axial.

FIG. 5 further indicates that when the handle 16 is depressed, then the pivot mounting axis 28 moves upwardly, such as to the second position shown in FIG. 5, by way of example. That of course has elevated the pivot axis 28, and thus the cutter 26 is raised to a higher position than that of the cutter 27. Throughout, the fixed pivot 32 for the cutter 27 causes the pivot axis 36 to move along the arc 45. Also, with the two cutters connected at 36, the cutter 26 is caused to move along the arc designated 45, and, with the two cutters connected at 36 in the diagrammatic showing, the cutters 26 and 27 assume the positions indicated.

Both cutters 26 and 27, being identical, are arranged with the through holes 39, 40, 41, and 42, as seen in FIG. 3. That is, both cutters have those four holes extending therethrough in the direction parallel to the axis 36, and only slightly off the axis 36, that is, adjacent thereto, and the four holes are preferably of four different sizes for receiving four different cross-sectional sizes of rod placed in the holes and then to be cut by the cutters 26 and 27.

That is, when the cutters 26 and 27 are pivoted through the pivotal action of the handle 16, as described, and as indicated in FIG. 5, then one of the shown cutter holes in FIG. 5, such as the hole 41, will move up to the position indicated in FIG. 5, and the corresponding hole 41 between the two cutters 26 and 27 will move out of initial alignment which they occupied in FIG. 1, and that movement will cause a sheer cutting of the rod disposed therein, as desired.

Thus the four holes present cutting edges on the respective cutters 26 and 27, and the cutting edges can extend for the complete circumference of each of the holes. With that arrangement, the cutters can be interchanged in their respective shown positions, and they can also be inverted. In that manner, various cutting edges are presented to the rod and thus the life of the cutter is extended by virtue of the fact that different cutting edges are available for cutting the rod. That is, both ends of each of the four holes on each of the cutters presents a circular cutting edge.

As shown, the pivot mounting 18 is a bolt with a head 43 seen in FIG. 3, and the companion nut 19 is on the end of the bolt 18. Both the head 43 and the nut 19 present flange or flat annular surfaces to their respective base 17 and block 22 to thereby restrict movement of the handle 16 along the axes 18. Likewise, the connection 36 is a bolt which has a head 38 and the nut 37 is on the other end, and they too present an annular flange or planar surface in abutment with the respective walls or sides of the cutters 26 and 27 to thereby hold the cutters 26 and 27 against any relative movement along the axis 36. Thus, the cutters 26 and 27 are held in sliding contact throughout their pivoting and cutting action.

FIG. 4 shows the detail of the cutters, the holes, and the bolt 36 and nut 37. Also, FIG. 3 shows that the base block 14 has a cut-out 44 for receiving the end 46 of the cutter 27, as seen in FIG. 3.

In this arrangement, there is optimum mechanical force-advantage by means of the handle 16 having the long lever arm compared to the distance between the axes 18 and 28. In actuality, the arm 16 can be made of only a needed length in order to exert the force necessary to cut the rod, because of that mechanical advantage. Included in that, is the mechanical advantage which is achieved by means of having the cutting edges presented by the four holes located in the position immediately adjacent to the connection axis 36, and thus another mechanical force-advantage is achieved.

For optimum sturdiness, the handle block 22 can be provided with an arcuate surface 47 which bears upon the inclined block wall 23 to thus stabilize the handle block 22 in the forceful action required. Of course the arc 47 would be concentric with the handle pivot axis 18, and would extend to where it rests upon the inclined wall 23 with the mounting bolt 18 in its assembled position.

The rod cut by this cutter is of metal, generally titanium, so it is a very sturdy type of material generally in a cylindrical shape to be received reasonably snugly in the cutting holes 39, 40, 41, and 42. The two terminal ends of each of the eight holes on the two cutters present the circular cutting edges, as mentioned. Also, it will be understood that the two cutters 26 and 27 act in a scissors-like cutting manner in that they are commonly pivotally movable about the pivot axis defined as 36.

As mentioned, while a table-mounted cutter is shown, it could be a cutter with the shown cutter links with each link pivoted to a handle where the beam 13 and the block 14 form a handle, like the handle 16. Thus, there could be the cutter with two handles, each with a link pivoted thereon as with the handle 16, and without the base 10, as such, though the term "base" means a handle in the context of the claim lexicography. In that context, the pad 11 is simply in the position of a hand grip, like the grip 21.

What is claimed is:

1. A rod cutter comprising
   a base,
   a handle pivotally mounted on said base and having a pivot axis,
   a pair of cutters with each thereof having a first end and a second end oppositely disposed to each other and with said cutters being pivotally pinned together at said first ends thereof and with said cutters each having a hole therethrough and with said holes being alignable with each other in a first pivoted position of said cutters for reception of a rod to be cut,
   said cutters each having a cutter pivot axis at said second ends of said cutters and are respectively pivotally mounted on said base and said handle at said cutter axes for pivoting said cutters to a second pivoted position which is that of non-alignment of said holes upon pivoting of said handle, and thereby cut a rod which is disposed in said holes when said holes are aligned,
   the pivot axis of said handle and the cutter pivot axis of said cutter which is pivotally mounted on said base are disposed to be offset from each other to thereby provide a mechanical force-advantage in the pivoting of said handle in the cutting of the rod, and
   said cutter pivot axes of the pivot mounting of said cutters respectively on said base and on said handle are disposed in co-axial alignment when said cutters are in said first pivoted position.

2. The rod cutter as claimed in claim 1, including
   a plurality of said holes in each of said cutters and with said holes on one of said cutters being disposed to be alignable with respective said holes on the other of said cutters and thereby present a plurality of pairs of said holes, and
   said pairs of said holes being of sizes different from each other to accommodate varying sizes of rods to be cut.

3. The rod cutter as claimed in claim 2, wherein
   said holes are disposed on said first ends of said cutters and adjacent the pinned connection of said cutters.

4. The rod cutter as claimed in claim 1, wherein said pinned connection and said pivotal mountings are all releasably arranged for disassembly of said cutters from each other and from said base and said handle and thereby provide for inversion of said cutters for re-assembly and re-mounting thereof.

5. The rod cutter as claimed in claim 1, wherein said cutters are identical to each other, and are arranged to be interchangeable.

6. The rod cutter as claimed in claim 1, wherein said cutters are disposed in side-by-side and sliding contact relation.

7. The rod cutter as claimed in claim 1, wherein said holes have cutting edges completely surrounding said holes and are arranged to thereby have said cutting edges contact said rod when said cutters are selectively either interchanged or inverted.

8. A rod cutter comprising a pair of force-applying members pivotally attached together on a main pivot axis extending therethrough, a pair of cutters with each having a respective cutter pivot axis axis and being respectively pivotally mounted on said members in pivot mountings at said respective pivot axis in an arrangement of a mechanical force-advantage relative to said main pivot axis of said members and with said cutters extending from their respective said cutter pivot axis in an extending end, said respective cutter pivot axis being in co-axial alignment for reception of a be cut, said extending ends of said cutters being pivotally connected together in a pivot connection, and said cutters having rod-cutting edges for cutting the rod upon pivoting of said cutters about said pivot mountings and said pivot connection.

9. The rod cutter as claimed in claim 8 wherein said cutters are identical to each other and are disposed in side-by-side sliding contact.

10. The rod cutter as claimed in claim 9, including said cutting edges being formed by holes extending through said cutters and with said holes being arranged to be alignable between said cutters in a commencement position for cutting action and having said cutting edges surrounding said holes, for cutting said rod placed in said aligned holes at the commencement of the cutting action.

11. The rod cutter as claimed in claim 10, wherein there are a plurality of said holes in each of said cutters and with said holes on one of said cutters being disposed to be alignable with respective said holes on the other of said cutters and thereby present a plurality of pairs of said holes, and said pairs of said holes being of sizes different from each other to accommodate varying sizes of rods to be cut.

12. The rod cutter as claimed in claim 8 wherein said cutting edges are disposed adjacent said pivot connection of said cutters, for a cutting-action mechanical force-advantage relative to said members.

13. The rod cutter as claimed in claim 8 wherein said pivot mountings and said pivot connection are respectively arranged to be releasable mountings and a releasable connection for interchangeability and inversion of said cutters.

14. A rod cutter for use on a table top comprising a base for sitting on a table top, a handle pivotally mounted on said base, two rod cutters consisting of a first rod cutter and a second rod cutter and with said first rod cutter pivotally mounted on said base on a first pivot axis and with said cutters pivotally connected to each other on a second pivot axis offset from said first pivot axis in an arrangement to pivot said cutters relative to each other in response to the pivoting of said handle, said cutters being identical to each other and having holes therein which align between said cutters for receiving a rod in said aligned holes and being arranged for pivoting said cutters to move said holes out of alignment with each other and thereby cut said rod disposed in said holes, said handle is pivotally mounted on said base at a fixed mounting location offset from said first pivot axis and said second cutter is pivotally mounted on said handle at said first pivot axis, and said offset between said fixed mounting and said first pivot axis is approximately one-third the offset from said fixed mounting and said second pivot axis at the connection between said cutters.

15. The rod cutter as claimed in claim 14 wherein said holes are arranged in pairs between said cutters and with said pairs being of sizes different from each other for receiving rods of varying sizes for cutting said rods.

16. The rod cutter as claimed in claim 15, including said base and said handle having respective surfaces disposed to be in contact with each other in one pivoted position of said handle and to thereby align said holes in pairs for reception of the rod to be cut.

17. A rod cutter comprising a pair of force-applying members pivotally attached together on a main pivot axis extending through said members, each of said members having an additional pivot axis which is in addition to said main pivot axis and which is disposed parallel to and offset from said main pivot axis in a fixed radial distance therefrom, a pair of cutters with each one thereof being pivotally mounted on a respective one of said members at said additional pivot axis, each said additional pivot axis being in co-axial alignment for reception of a rod to be cut, each of said cutters extending from the respective said additional pivot axis and along a plane perpendicular thereto in both an extending portion and an extending end extending beyond said portion, each said extending end of said cutters being pivotally connected with each other in a pivot connection, and said cutters having rod-cutting edges on each said extending portion and adjacent said pivot connection and axially offset therefrom to only one side thereof for cutting the rod upon pivoting of said members about said main pivot axis and thereby pivoting said cutters about a respective said additional pivot axis.

18. The rod cutter as claimed in claim 17, wherein said cutters are identical to each other in shape and are disposed in side-by-side sliding contact.

19. The rod cutter as claimed in claim 17, wherein
said radial distance of said offset of each said additional pivot axis on said members is identical to said radial distance of said offset of the other.

20. The rod cutter as claimed in claim 17, wherein
said rod-cutting edges are formed on circular holes extending through each of said cutters with a variety of diameters for receiving and cutting rod of a variety of diameters.

21. The rod cutter as claimed in claim 20, including
said members have respective surfaces disposed to be in contact with each other in one pivoted position of said members and thereby limit pivoting of said members in a direction toward said surfaces and with said circular holes being disposed to be aligned with each other when said surfaces are in contact with each other.

* * * * *